(12) United States Patent
Dawkins et al.

(10) Patent No.: US 6,507,893 B2
(45) Date of Patent: *Jan. 14, 2003

(54) SYSTEM AND METHOD FOR TIME WINDOW ACCESS FREQUENCY BASED CACHING FOR MEMORY CONTROLLERS

(75) Inventors: William Price Dawkins, Round Rock, TX (US); Karl David Schubert, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 144 days.

This patent is subject to a terminal disclaimer.

(21) Appl. No.: 09/771,248

(22) Filed: Jan. 26, 2001

(65) Prior Publication Data

US 2002/0103965 A1 Aug. 1, 2002

(51) Int. Cl.$^7$ ............................................. G06F 12/00
(52) U.S. Cl. ..................... 711/133; 711/113; 711/114; 711/122; 714/5; 714/6; 709/203; 710/312; 710/74
(58) Field of Search ................. 714/6, 5; 711/113–114, 711/122; 709/203; 710/312, 74

(56) References Cited

U.S. PATENT DOCUMENTS

| | | | | |
|---|---|---|---|---|
| 5,276,832 A | | 1/1994 | Holman, Jr. ................. 395/425 |
| 5,325,508 A | | 6/1994 | Parks et al. ................. 395/425 |
| 5,452,440 A | | 9/1995 | Salsburg ..................... 395/463 |
| 5,511,180 A | | 4/1996 | Schieve .................. 395/497.03 |
| 5,555,395 A | | 9/1996 | Parks ......................... 395/472 |
| 5,572,660 A | | 11/1996 | Jones .................... 395/182.04 |
| 5,623,633 A | | 4/1997 | Zeller et al. ................. 395/473 |
| 5,623,700 A | | 4/1997 | Parks et al. ................. 395/873 |
| 5,627,990 A | * | 5/1997 | Cord et al. .................. 711/122 |
| 5,632,038 A | | 5/1997 | Fuller ......................... 395/750 |
| 5,717,894 A | | 2/1998 | Vivio ......................... 395/465 |
| 5,761,725 A | | 6/1998 | Zeller et al. ................. 711/146 |
| 5,867,640 A | * | 2/1999 | Aguilar et al. .................. 714/6 |
| 5,890,213 A | | 3/1999 | Sokolov ...................... 711/113 |
| 5,896,493 A | | 4/1999 | Rao ....................... 395/182.04 |
| 5,903,911 A | | 5/1999 | Gaskins ...................... 711/141 |

(List continued on next page.)

OTHER PUBLICATIONS

U.S. patent application Ser. No. 09/770,146, Dawkins et al., filed Jan. 26, 2001.

*Primary Examiner*—Do Hyun Yoo
*Assistant Examiner*—Mehdi Namazi
(74) *Attorney, Agent, or Firm*—Baker Botts L.L.P.

(57) ABSTRACT

A system and method for replacing cached data for a computer system utilizing one or more storage devices is disclosed. The storage devices are divided into a plurality of areas or bins. Each bin is preferably the same size. A Window Access Table (WAT) is an array stored in memory that contains all the time windows for each bin. Each time window holds a frequency value corresponding to the number of times the bin has been accessed during the time period corresponding to that time window. A hot spot algorithm is used to calculate a hot spot value hsf(x) for each bin based on its associated frequency values listed in the WAT. The hot spot algorithm uses scaling coefficients to weight the frequency values based on the time window. Each line in cache will therefore have an associated bin for which a hot spot value hsf(x) has been calculated. This data may be stored in a hot spot table. When data is retrieved from a storage in response to a cache miss, the memory controller will compare the hot spot value hsf(a) of the bin associated with the new data to the lowest hot spot value hsf(z) in the hot spot table. If hsf(z) is greater than hsf(a), then this indicates that bin (z), the bin with the lowest hot spot value is accessed more frequently than bin (a), the bin containing the retrieved data. Thus if hsf(z) is greater than hsf(a), then the cache line containing data from bin (z) will not be replaced. If hsf(a) is greater than hsf(z) then the new data from bin (a) will replace the cached data from bin (z).

49 Claims, 7 Drawing Sheets

U.S. PATENT DOCUMENTS

| | | | |
|---|---|---|---|
| 5,974,497 A | 10/1999 | Teshome | 710/129 |
| 6,094,706 A | 7/2000 | Factor | 711/113 |
| 6,145,056 A | 11/2000 | Heydon et al. | 711/129 |
| 6,148,368 A * | 11/2000 | Dekoning | 711/113 |
| 6,212,631 B1 | 4/2001 | Springer et al. | 713/1 |
| 6,243,795 B1 * | 6/2001 | Yang et al. | 711/159 |
| 6,269,423 B1 * | 7/2001 | Kishi | 711/113 |

* cited by examiner

| BIN 0 | $f_{00}$ | $f_{01}$ | $f_{02}$ | | $f_{0,k-1}$ |
|---|---|---|---|---|---|
| BIN 1 | $f_{10}$ | $f_{11}$ | $f_{12}$ | | $f_{1,k-1}$ |
| BIN 2 | $f_{20}$ | $f_{21}$ | $f_{22}$ | | $f_{2,k-1}$ |
| | | | | | |
| BIN n-1 | $f_{n-1,0}$ | $f_{n-1,1}$ | $f_{n-1,2}$ | | $f_{n-1,k-1}$ |

| CACHE LINE 0 | | BIN $x_0$ | HSF($x_0$) |
|---|---|---|---|
| CACHE LINE 1 | | BIN $x_1$ | HSF($x_1$) |
| ⋮ | | ⋮ | ⋮ |
| | | BIN $z$ | HSF($z$) |
| | | ⋮ | ⋮ |
| CACHE LINE m | | BIN $X_m$ | HSF($X_m$) |
| CACHE | | HASH TABLE | |

FIG.8a

| CACHE LINE 1 | BIN 0 | 8.5 |
|---|---|---|
| CACHE LINE 2 | BIN 2 | 30.1 | t=0

FIG.8b

| CACHE LINE 1 | BIN 1 | 17 |
|---|---|---|
| CACHE LINE 2 | BIN 2 | 30.1 | t=0+

SYSTEM AND METHOD FOR TIME WINDOW ACCESS FREQUENCY BASED CACHING FOR MEMORY CONTROLLERS

CROSS-REFERENCE OF RELATED APPLICATION

The application is related to U.S. application Ser. No. 09/770,146, filed Jan. 26, 2001, titled "System and Method for Time Weighted Access Frequency Based Caching for Memory Controllers" filed by Williams Dawkins et al., which is filed concurrently herewith and which is incorporated herein by reference in its entirety for all purposes.

TECHNICAL FIELD

The present disclosure relates in general to the field of computer systems, and, more particularly, to a system and method for caching data retrieved from one or more storage devices.

BACKGROUND

Computer networking environments such as Local Area Networks (LANs) and Wide Area Networks (WANs) permit many users, often at remote locations, to share communication, data, and resources. A storage area network (SAN) may be used to provide centralized data sharing, data backup, and storage management in these networked computer environments. A SAN is a high-speed subnetwork of shared storage devices. The combination of a LAN or WAN with a SAN may be referred to as a shared storage network. A storage device is any device that principally contains a single disk or multiple disks for storing data for a computer system or computer network. Because these storage devices are intended to serve several servers, these storage devices are typically capable of storing much more data than the hard drive of a desktop computer. The collection of storage devices is sometimes referred to as a storage pool. The storage devices in a SAN can be co-located, which allows for easier maintenance and easier expandability of the storage pool. The network architecture of most SANs is such that all of the storage devices in the storage pool are available to all the servers on the LAN or WAN that is coupled to the SAN. Additional storage devices can be easily added to the storage pool, and these new storage devices will also be accessible from any server in the larger network.

In a computer network that includes a SAN, the server can act as a pathway or transfer agent between the end user and the stored data. Because much of the stored data of the computer network resides in the SAN, rather than in the servers of the network, the processing power of the servers can be used for applications. Network servers can access a SAN using the Fibre Channel protocol, taking advantage of the ability of a Fibre Channel fabric to serve as a common physical layer for the transport of multiple upper layer protocols, such as SCSI, IP, and HIPPI, among other examples.

The storage devices in a SAN may be structured in a redundant array of independent disks (RAID) configuration. When a system administrator configures a shared data storage pool into a SAN, each storage device may be grouped together into one or more RAID volumes and each volume is assigned a SCSI logical unit number (LUN) address. If the storage devices are not grouped into RAID volumes, each storage device will typically be assigned its own LUN. The system administrator or the operating system for the network will assign a volume or storage device and its corresponding LUN to each server of the computer network. Each server will then have, from a memory management standpoint, logical ownership of a particular LUN and will store the data generated from that server in the volume or storage device corresponding to the LUN owned by the server.

A RAID controller board is the hardware element that serves as the backbone for the array of disks. The RAID controller relays the input/output (I/O) commands or read/write requests to specific storage devices in the array. The RAID controller provides the physical link to each of the storage devices so that the disks may be easily removed or replaced. In order to provide greater fault tolerance, the RAID controller also serves to monitor the integrity of each storage device in the array to anticipate the need to move data in the event of a faulty or failing disk drive.

RAID controllers may also cache data retrieved from the storage devices. RAID controller support for caching may improve the I/O performance of the disk subsystems of the SAN. RAID controllers generally use read caching, read-ahead caching or write caching, depending on the application programs used within the array. For a system using read-ahead caching, data specified by a read request is read, along with a portion of the succeeding or sequentially related data on the drive. This succeeding data is stored in cache memory on the RAID controller. If a subsequent read request uses the cached data, access to the drive is avoided and the data is retrieved at the speed of the system I/O bus. Read-ahead caching is ideal for applications that store data in large sequential records, such as video image processing. However, read-ahead caching is ill-suited for random-access applications, such as transactional or database applications. In random-access applications, read requests are usually not sequentially related to previous read requests. As a result, if most of the SAN storage applications are random-access applications, the data read for caching purposes rarely results in a cache hit.

RAID controllers may also use write caching. Write-through caching and write-back caching are two distinct types of write caching. For systems using write-through caching, the RAID controller does not acknowledge the completion of the write operation until the data is written to the drive. In contrast, write-back caching does not copy modifications to data in the cache to the cache source until absolutely necessary. The RAID controller signals that the write request is complete after the data is stored in the cache but before it is written to the drive. The caching method improves performance relative to write-through caching because the application program can resume while the data is being written to the drive. However, there is a risk associated with this caching method because if system power is interrupted, any information in the cache may be lost.

To improve cache hit rates on random access workloads, RAID controllers typically use cache algorithms developed for processors, such as those used in desktop computers. Processor cache algorithms generally rely on the locality of reference of their applications and data to realize performance improvements. As data or program information is accessed by the computer system, this data is stored in cache in the hope that the information will be accessed again in a relatively short time. Once the cache is full, an algorithm is used to determine what data in cache should be replaced when new data that is not in cache is accessed. Generally, a least recently used (LRU) algorithm is used to make this determination. Because processor activities normally have a high degree of locality of reference, this algorithm works well for these applications. It is not unusual to observe processor cache hit rates of 90% or greater.

However, secondary storage I/O activity rarely exhibits the degree of locality for accesses to processor memory. The effectiveness of processor based caching algorithms can be very low for RAID controllers. The use of a RAID controller cache that uses processor based caching algorithms may actually degrade performance in random access applications due to the processing overhead incurred by caching data that will not be accessed from the cache before being replaced. As a result, conventional caching methods are not effective for storage applications. Some storage subsystems vendors increase the size of the cache in order to improve the cache hit rate. However, given the associated size of the SAN storage devices, increasing the size of the cache may not significantly improve cache hit rates. For example, in the case where 64 MB cache is connected to twelve 32 GB drives, the cache is only 0.0175% the size of the associated storage. Even if the cache size is doubled, increasing the cache size will not significantly increase the hit ratio because the locality of reference for these systems is low.

Figure 1:
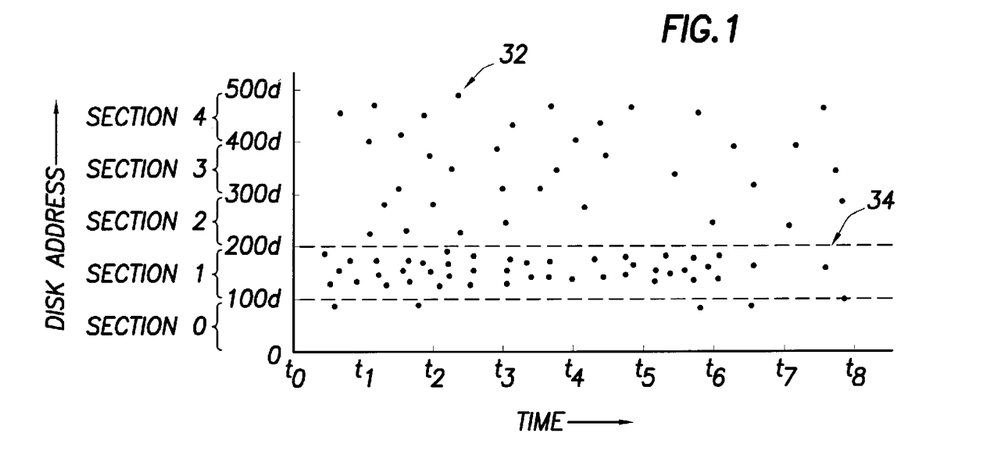
FIG. 1 is a diagram illustrating a hot spot.

As discussed above, many I/O access patterns for disk subsystems exhibit low levels of locality. However, while many applications exhibit what may be characterized as random I/O access patterns, very few applications truly have completely random access patterns. The majority of data most applications access are related and, as a result, certain areas of storage are accessed with relatively more frequency than other areas. The areas of storage that are more frequently accessed than other areas may be called "hot spots." FIG. 1 shows I/O access patterns as a function of disk address and time. For purposes of illustration, the disk is divided into five sections of disk addresses. When viewed for only a short period of time, from time $t_0$ to $t_1$ for example, I/O accesses 32 are basically random and do not exhibit a pattern that may be exploited for caching purposes. However, when viewed over a period of time, one may observe that I/O access patterns are more dense in certain areas of storage than other areas. In this case, I/O access patterns occur more frequently in the zone 34 corresponding to disk address section 1 during the time period of time $t_0$ to $t_6$. Thus, section 1 may be considered a hot spot during this time period because data is being accessed more frequently in this area of storage in comparison to other areas. For example, index tables in database applications are generally more frequently accessed than the data store of the database. Thus, the storage areas associated with the index tables for database applications would be considered hot spots, and it would be desirable to maintain this data in cache. However, for storage I/O, hot spot references are usually interspersed with enough references to non-hot spot data such that conventional cache replacement algorithms, such as LRU algorithms, do not maintain the hot spot data in cache long enough to be re-referenced. Because conventional caching algorithms used by RAID controllers do not attempt to identify hot spots, these algorithms are not effective for producing a large number of cache hits.

SUMMARY

In accordance with teachings of the present disclosure, a system and method for replacing cached data retrieved from one or more storage devices in a computer system is disclosed that provide significant advantages over prior developed systems.

The storage devices are divided into a plurality of areas or bins. Each bin is preferably the same size. A Window Access Table (WAT) is an array stored in memory that contains all the time windows for each bin. Each time window holds a frequency value corresponding to the number of times the bin has been accessed during the time period corresponding to that time window. A hot spot algorithm is used to calculate a hot spot value $hsf(x)$ for each bin based on its associated frequency values listed in the WAT. The hot spot algorithm uses scaling coefficients to weight the frequency values based on the time window. Thus, the current time window may be weighted more heavily than older time windows in determining the hotpot value $hsf(x)$ for a particular bin. Each line in cache will therefore have an associated bin for which a hot spot value $hsf(x)$ has been calculated. This data may be stored in a hot spot table. The hot spot table may be a separate table or stored in the WAT.

When data is retrieved from a storage in response to a cache miss, a memory controller, such as a processor or RAID controller, will compare the hot spot value $hsf(a)$ of the bin associated with the new data to the lowest hot spot value $hsf(z)$ in the hot spot table. If $hsf(z)$ is greater than $hsf(a)$, then this indicates that bin $(z)$, the bin with the lowest hot spot value has a weighted access frequency greater than bin $(a)$, the bin containing the retrieved data. Thus if $hsf(z)$ is greater than $hsf(a)$, then the cache line containing data from bin $(z)$ will not be replaced. If $hsf(a)$ is greater than $hsf(z)$ then the new data will replace the cached data from bin $(z)$. The WAT table is updated after the I/O access.

A technical advantage of the present invention is that the cache replacement algorithm is based on frequency of use and is able to track hot spot data longer than least recently used algorithms or similar cache replacement methods. As a result, the present invention is well suited for applications that exhibit from low levels of locality, such as applications utilizing several large storage devices with random I/O access patterns. The present invention also eliminates stale data from cache while retaining cached data that has the potential to produce cache hits over a selected period of time. Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 2:
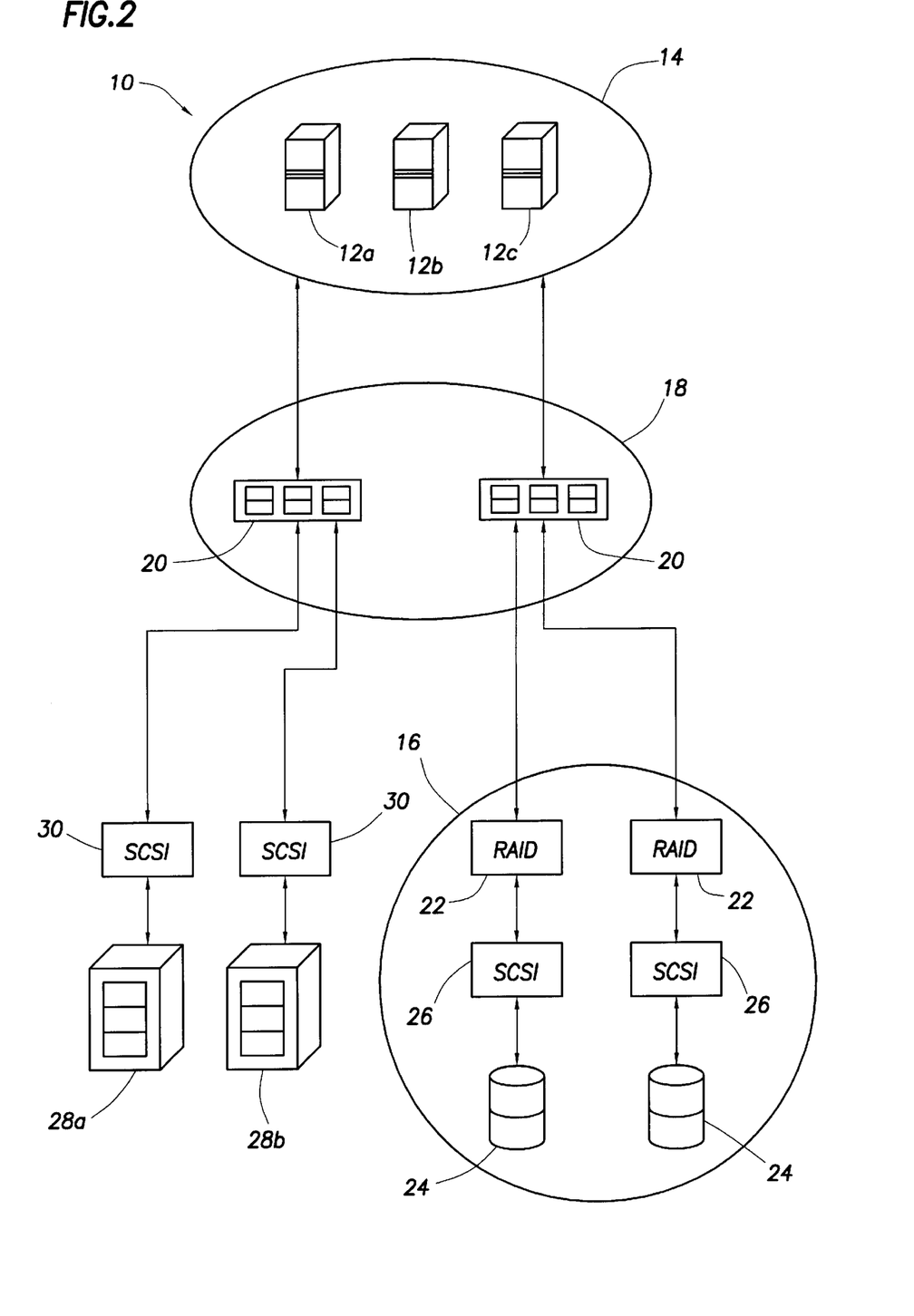
FIG. 2 is a diagram of a computer network.

FIG. 2 is a diagram of a computer system or network. A shared storage network, indicated generally at 10, includes a plurality of servers 12a, 12b, and 12c, which form part of computer network 14. Servers 12 can include UNIX-based servers, WINDOWS NT-based servers, NETWARE servers, thin server computers, and other server systems. Computer network 14 can include, for example, a local area network (LAN), a wide area network (WAN), or other computer network allowing transmission of data between computing devices. Servers 12 may employ a variety of network protocols for the transfer of data, including TCP/IP. The number of servers may vary from the number shown in FIG. 2 and described in this disclosure.

Shared storage network 10 includes several storage subsystems 16. Servers 12 within computer network 14 can transfer data between other servers 12 as well as to and from the storage subsystems 16. The storage subsystems 16 provides a large amount of storage space and can be operated as the consolidated storage for computer network 14. The storage subsystems 16 are coupled to computer network 14 via Fibre Channel fabric or switching fabric 18. The Fibre Channel fabric 18 is composed of several Fibre Channel switches 20 that allow various electronic interconnections between the various devices that compose shared storage network 10. The Fibre Channel fabric 18 and the storage subsystems 16 comprise a storage area network (SAN). The storage subsystems 16 includes a storage controller 22 that is coupled to a plurality of physical storage devices 24, collectively known as a storage pool. The storage pool may be connected to the storage controller by a number of protocols, including but not limited to SCSI, Fibre Channel and ATA/IDE. Storage devices 24 may be any devices suitable for storing data, such as a collection of hard disk drives or other integrated non-volatile memory. If storage device 24 is a SCSI device, then shared storage network 10 may include a SCSI bridge 26. SCSI bridge 26 is a communications device that allows a SCSI device to communicate electronically with devices employing Fibre Channel protocol. For example, SCSI bridge 26 may be a SCSI/FC bridge. SCSI bridge 26 may be incorporated into another device, such as Fibre Channel switches 20 or storage controllers 22, or may be a separate component.

Storage controller 22 coordinates access to storage devices 24. The storage controller is preferably a RAID (Redundant Array of Independent Disks) controller. While the following disclosure describes the present invention being implemented with a RAID controller, the present invention may be implemented with any memory controller. Thus, the following invention may be implemented with a processor in addition to a storage controller such as a RAID controller. The memory controller comprises logic operable to manipulate or maintain a cache. The cache may be integral to the memory controller. Storage devices 24 are grouped into RAID volumes and each volume is assigned a SCSI logical unit number (LUN) address. In this configuration, SAN 16 can use SCSI addressing methods to store and retrieve data from storage devices 24. SAN 16 can include fewer or more storage devices 24 than depicted in FIG. 2. Shared storage network 10 may further include dedicated backup storage devices 28. If the backup storage devices 28 are SCSI devices, they may be coupled to Fibre Channel fabric 18 via SCSI bridges 30. Dedicated backup storage devices 28 can include, for example, computing devices having removable storage such as a tape medium or any other computer readable medium conventionally used for backup storage.

Figure 3A:
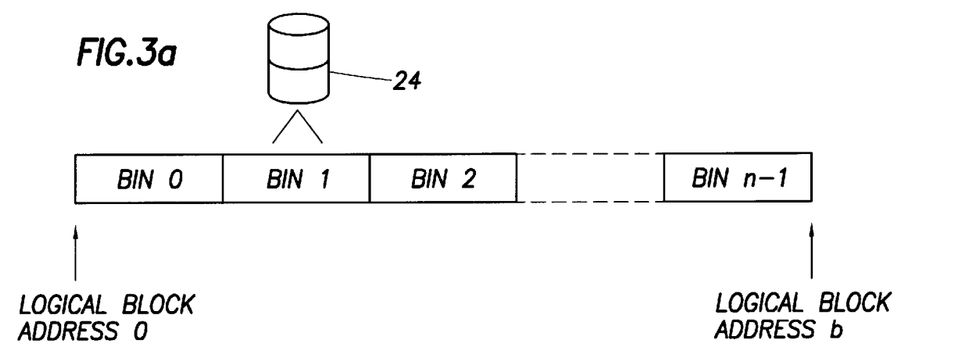
FIGS. 3a and 3b are diagrams illustrating an embodiment of a bin of the present invention.
Figure 3B:
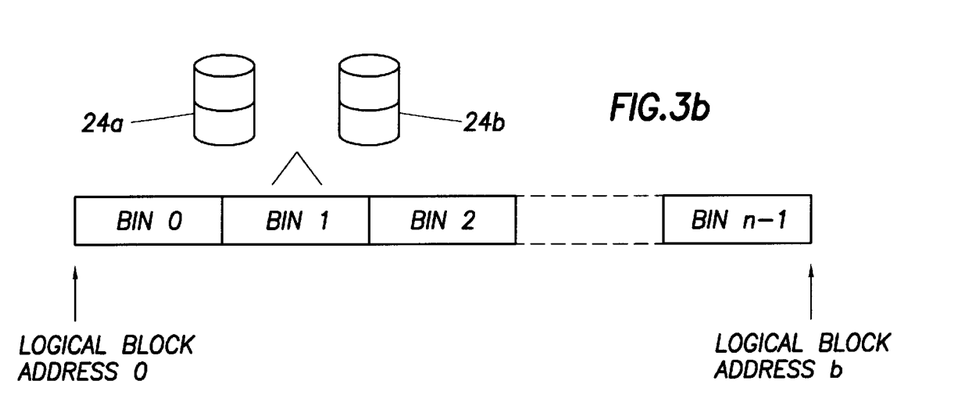

Each logical volume of storage may be divided into n areas or bins. Each bin is preferably the same size. Thus, for a logical volume that contains logical block addresses 0 to b, each bin may correspond to b/n logical block addresses. As shown in FIG. 3a, if a logical volume of storage corresponds to a single storage device or disk 24, then the storage volume associated with that storage device 24 may be divided into n bins. Alternatively, a logical volume of storage may correspond to the storage volume of several storage devices 24, or to selected sections of the storage volumes of several storage devices 24. In this case, as shown in FIG. 3b, the storage volumes of several storage devices 24 may be divided into n bins. Note that the following discussion and examples assume that the memory controller, such as a RAID controller, is only controlling one logical volume. The system and method of the present invention is also suitable for cases in which the memory controller controls multiple logical volumes.

Figure 4A:
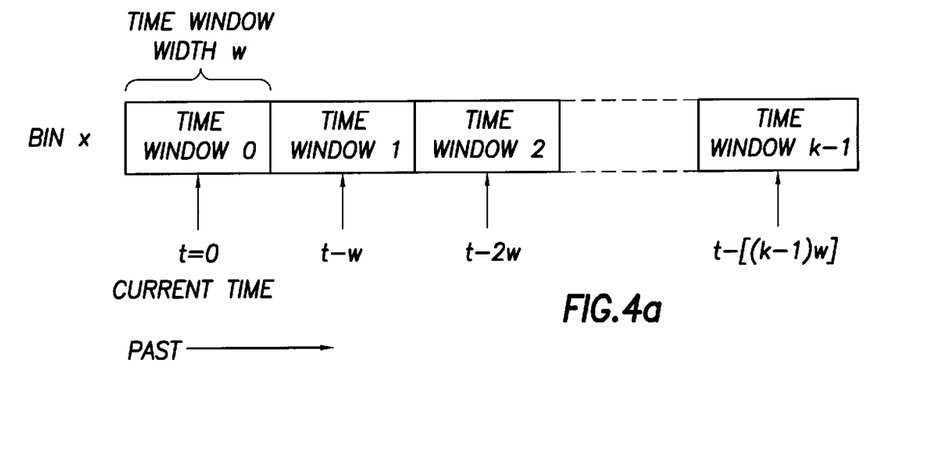
FIGS. 4a and 4b are diagrams illustrating an embodiment of a time window of the present invention.

The frequency with which a given bin is accessed over time, may be expressed as a set of time windows, as shown in FIG. 4a. The access history for bin x may be shown in k time windows of width or time duration w. The optimum value for the number of time windows k and time duration w may vary based on application, and can be determined from experimentation or system simulation. Each time window holds a value corresponding to the number of times bin x has been accessed during the time period corresponding to that time window. The first time window, time window k=0, stores the value corresponding to the current time, t=0. Subsequent time windows store the values corresponding to access frequency during past time periods. Thus, time window k−1 is the furthest back in time. One may maintain a longer history of access frequency for bin x as the number of time windows k increases. Thus, with a time window, one may observe the access pattern for a given bin over a certain amount of time.

Figure 4B:
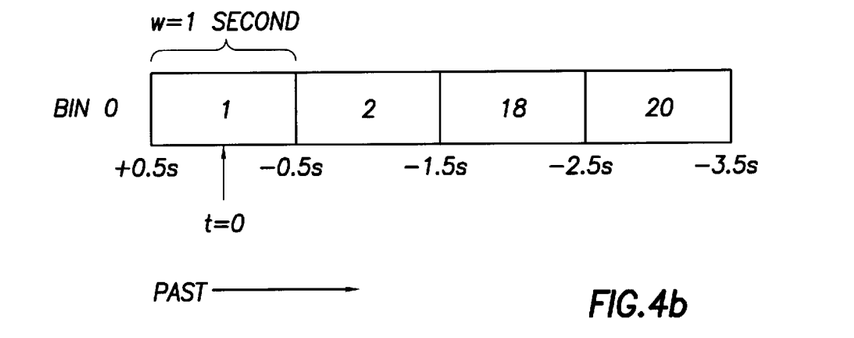

An example of a set of time windows for bin 0 at time, t=0 is shown in FIG. 4b. In this example, k=3, and w=1 second. At t=0, 0.5 seconds remain for time window 0, and the bin has been accessed once in the last 0.5 seconds. Bin 0 was accessed twice during time window 1, which represents the time period between 0.5 and 1.5 seconds in the past. Bin 0 was accessed 18 times during time window 2, which represents the time period between 1.5 seconds and 2.5 seconds ago, and 20 times during time window 3, which represents the time period between 2.5 and 3.5 seconds ago. In this particular example, the access frequency for bin 0 is decreasing, which may indicate that bin 0 no longer contains a hot spot.

Figure 5:
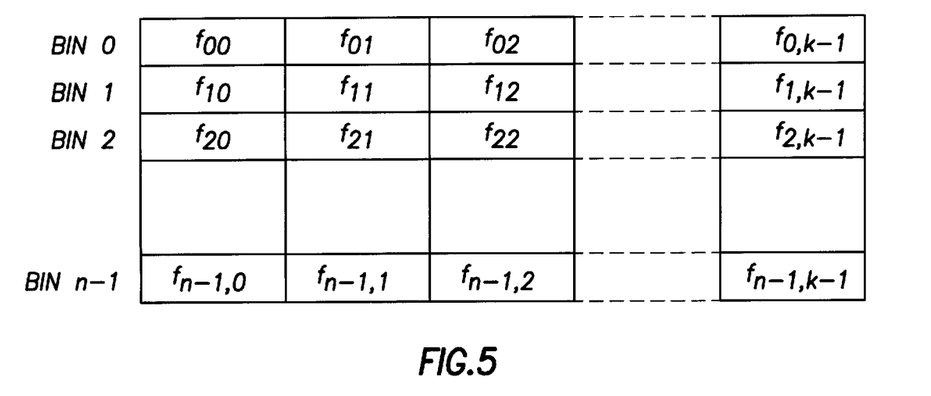
FIG. 5 is a diagram illustrating an embodiment of a Window Access Table of the present invention.

FIG. 5 shows a window access table (WAT), which is a two-dimensional array that stores the time windows for each bin in a logical volume. The first dimension of the WAT is an index into the array based on bin number. The second dimension is an index into the array based on time window. The individual entries in the array are the number of times a particular bin has been accessed in a particular time window. The memory controller may allocate the WAT in its local memory or cache. Alternatively, the WAT may be located in memory other than the cache. For example, the WAT may be stored in a memory location associated with another device coupled to the network system. The size of the bins is typically inversely related to size of the WAT. As more rows of the WAT are allocated in memory, the bin size may be made smaller. For example, if the memory controller has a WAT size of 100 rows and the total size of the storage it controls is 100 GB, then each bin may correspond to 1 GB. As the bin size decreases, the cache hit ratio of the presently disclosed caching algorithm may increase. Therefore, it is preferable to minimize the size of the bins. If the memory controller handles more than one logical volume, several WATs may be used, one for each logical volume for example, or one WAT for all of the logical volumes. Alternatively, only selected logical volumes may have an associated WAT.

Figure 6A:
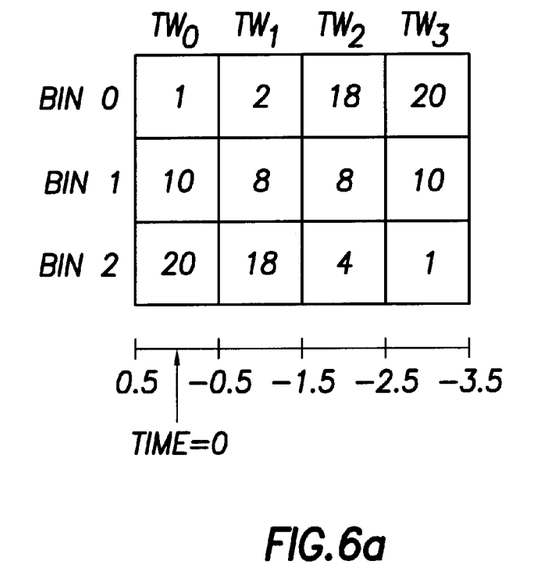
FIGS. 6a and 6b are diagrams illustrating an example of updating the WAT of the present invention.
Figure 6B:
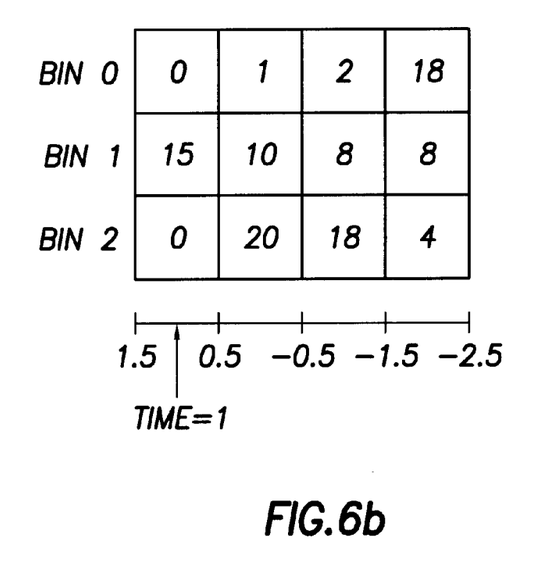

FIGS. 6a and 6b depict how the contents of the WAT table are updated over time. FIG. 6a shows a WAT table at time t=0. In this example, the WAT table contains four time windows, $TW_0$ through $TW_3$, wherein each time window corresponds to one second. The WAT table contains frequency values for three bins, bin 0 through bin 2. The frequency value correspond to the number of times an I/O access was directed to a given bin during a particular time window. For example, at time t=0, bin 0 was accessed 1 time in $TW_0$, 2 times in $TW_1$, 18 times in $TW_2$ and 20 times in $TW_3$. FIG. 6b shows the WAT table at time t=1. Time window $TW_0$ now contains the frequency values for the time period t=0.5 to 1. During this period, bin 0 and bin 3 were accessed 0 times and bin 1 was accessed 15 times. Because time has advanced from time t=0 to t=1, the frequency values in time windows $TW_0$ through $TW_2$ at time=0 have been shifted over to the next time window. Because the WAT only holds four time windows, the frequency values for $TW_3$ at time t=0 are discarded.

Thus, every one second, the length of a time window in this example, the counter in the first time window $TW_0$ is reset to zero, and the values in the other time windows are shifted to the next time window. For example, when the current time reaches the beginning of the first time window $TW_0$, the WAT may be logically restructured so that each column in the array is shifted to the right and the last column is moved to represent the current time window. As a result, column 0 logically becomes column 1, column 1 becomes column 2, column i becomes column i+1, and the last column, k−1, becomes the new first column 0. This particular implementation avoids the need to copy the values from one window to the next because, logically, only the starting point of the table is being changed.

Figure 7:
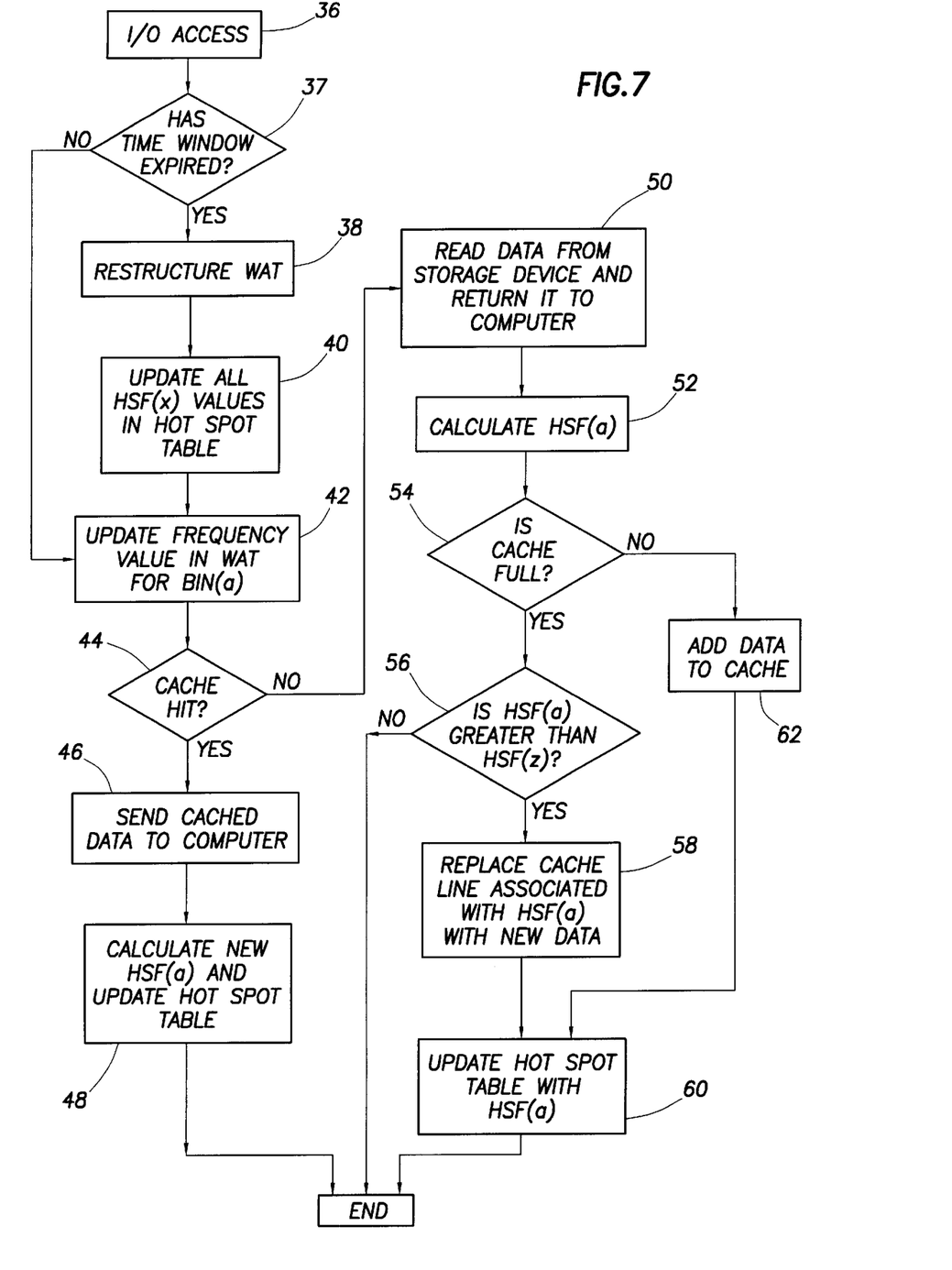
FIG. 7 is a flow diagram illustrating an embodiment of the present invention.

FIG. 7 is a flow diagram illustrating an embodiment of the system and method of the present invention. At step 36, an I/O access occurs. The I/O access may be either a read or write access. An I/O access occurs when a computer system or server 12 accesses a storage device 24 or logical volume of storage. As discussed above, each logical volume of storage may be divided into n equal areas or bins. Thus, the data sought by the I/O access will reside in a particular bin x in the logical volume. For the purposes of this discussion, bin(a) is the bin that contains the data sought by the present I/O access. As discussed above, each time window is of time duration W. In step 37, it must be determined whether or not the current time window has expired. If so, then the WAT is restructured in step 38 to update the contents of the time windows as discussed above. Next, all the hot spot values hsf(x) in the hot spot table are updated in step 40. The hot spot table and the determination of hot spot values hsf(x) will be discussed below. If the current time window has not expired, or after the hot spot table has been updated in step 40, then the WAT is updated to reflect the I/O access, at step 42. As discussed above, the frequency value contained in the current time window associated with a bin is increased with each I/O access directed to that bin. Thus, the frequency value stored in the current time window $TW_0$ for bin (a) is incremented by one to reflect the I/O access.

At step 44, the memory controller or other computer system or computer network device determines whether or not the data sought by the I/O access is present in cache. If a cache hit occurs, then the cached data is returned to the computer application in step 46. As discussed above, over a period of time, certain areas of storage are accessed more often than other areas. These areas of storage that are more frequently accessed are termed hot spots. The hot spot value hsf(x) is a weighted value corresponding to how frequently a given bin x is accessed over time. The hot spot value hsf(x) may be represented by the following formula:

$$hsf(x) = f_{x0} + \alpha_1 f_{x1} + \alpha_2 f_{x2} + \ldots + \alpha_{k-1} f_{xk-1} \quad \text{Equation (1)}$$

where $f_{xy}$ is the frequency entry from the WAT for bin x and time window y, and $\alpha_j$ is the scaling factor for time window j. The value for $\alpha_j$ is preferably $0 < \alpha_j < 1$.

The scaling factor $\alpha_j$ allows the caching algorithm to assign a different weight to each time window. As discussed above, certain bins are accessed more frequently than other bins and may be considered a hot spot. However, a bin is typically a hot spot for only a finite period of time. As time goes on, the access frequency will drop and the bin will no longer be considered a hot spot. For example, the hot spot in section 1 shown in FIG. 1 is present only from time $t_0$ to $t_6$. Accordingly, the frequency values for time windows further back in time may be considered less relevant than more recent time windows in determining whether data should remain in cache or be replaced. Therefore, the relationship between the scaling factors is preferably:

$$\alpha_1 > \alpha_2 > \ldots \alpha_{k-1}.$$

Thus, the frequency value for the current time window will be weighted more heavily in the determination of hsf(x) than those frequency values contained in past time windows. The optimum values for the scaling factors, as well as other parameters such as time window length, may be determined from testing, simulation or experimentation. These values may vary based on the size of the storage, the types of applications accessing storage, and other such factors. The values of the scaling coefficients and other parameters may be modified during the configuration of the storage or RAID controller by the administrator of the system. For example, the parameters may be optimized for specific applications or may be selected for overall performance in a wide variety of applications.

As an example, the hsf(x) values may be calculated for bins 0, 1 and 2 based on the frequency values contained in the WATs shown in FIGS. 6a and 6b. For this example, the scaling factors have the following values: $\alpha_1=0.5$, $\alpha_2=0.25$, and $\alpha_3=0.1$.

Time t=0
(1) Bin 0: hsf(0)=1+(0.5)(2)+(0.25)(18)+(0.1)(20)=8.5
(2) Bin 1: hsf(1)=10+(0.5)(8)+(0.25)(8)+(0.1)(10)=17
(3) Bin 2: hsf(2)=20+(0.5)(18)+(0.25)(4)+(0.1)(1)=30.1
Time t=1
(1) Bin 0: hsf(0)=0+(0.5)(1)+(0.25)(2)+(0.1)(18)=2.8
(2) Bin 1: hsf(1)=15+(0.5)(10)+(0.25)(8)+(0.1)(8)=22.8
(3) Bin 2: hsf(2)=0+(0.5)(20)+(0.25)(18)+(0.1)(4)=14.9

In this example, bin 2 had the highest hot spot value at time t=0. However, at time t=1, bin 1 possessed the highest hot spot value. Note that bin 2 was accessed 42 times over the time period t=2.5 to 1, while bin 1 was only accessed 41 times during this time period. However, even though bin 2 was accessed more times over this time period, bin 1 has a higher hot spot value hsf(x) at time t=1 because of the scaling factors. The scaling factors allow the caching algorithm to place emphasis on which bins were most recently accessed. Note that the hsf(x) formula listed above is only one embodiment of the present invention. The hot spot value may be any formula that aggregates time weighted frequency components, wherein the frequency components reflect the access frequency of the associated sections of a storage device. For example the hot spot value hsf(x) may be expressed as a logarithmic or exponential function. For instance, hsf(x) may be expressed as:

$$hsf(x)=(f_{x0})^{\beta_1}+\alpha_1(f_{x1})^{\beta_2}+\alpha_2(f_{x2})^{\beta_3}+\ldots+\alpha_{k-1}(f_{xk-1})^{\beta_k} \quad \text{Equation (2)}$$

wherein $\beta_j$ is a exponent associated with time window j that serves as a scaling parameter. In this case, the relationship between the exponents are preferably: $\beta_1 > \beta_2 > \ldots > \beta_k$.

Alternatively, the hot spot value may weight particular bins in addition to time windows. For example, the system administrator may wish to give a caching preference to certain bins. For instance, certain bins may be weighted based on the particular type of data or application that is stored in the bin, network or hardware considerations, or other factors. In this case, the hot spot value hsf(x) may be expressed as:

$$hsf(x)=\phi_x[f_{x0}+\alpha_1 f_{x1}+\alpha_2 f_{x2}+\ldots+\alpha_{k-1}f_{xk-1}] \quad \text{Equation (3)}$$

where $f_{xy}$ is the frequency entry from the WAT for bin (x) and time window y, $\alpha_j$ is the scaling factor for time window j, and $\phi_x$ is the scaling factor for bin (x). The hsf(x) values for each bin that contains data that is currently stored in cache may be stored in a hot spot table. The hot spot table may be any searchable table. One common implementation of a searchable table is a hash table. The hot spot table may be stored in the WAT or it may be a separate table. The hot spot table may be stored in the cache or it may be stored in other memory. For example, the hot spot table may be stored in a memory corresponding to another device coupled to the computer network. Once the cached data has been retrieved in step 46, the hot spot table is updated with hsf(a) in step 48.

Figure 8A:
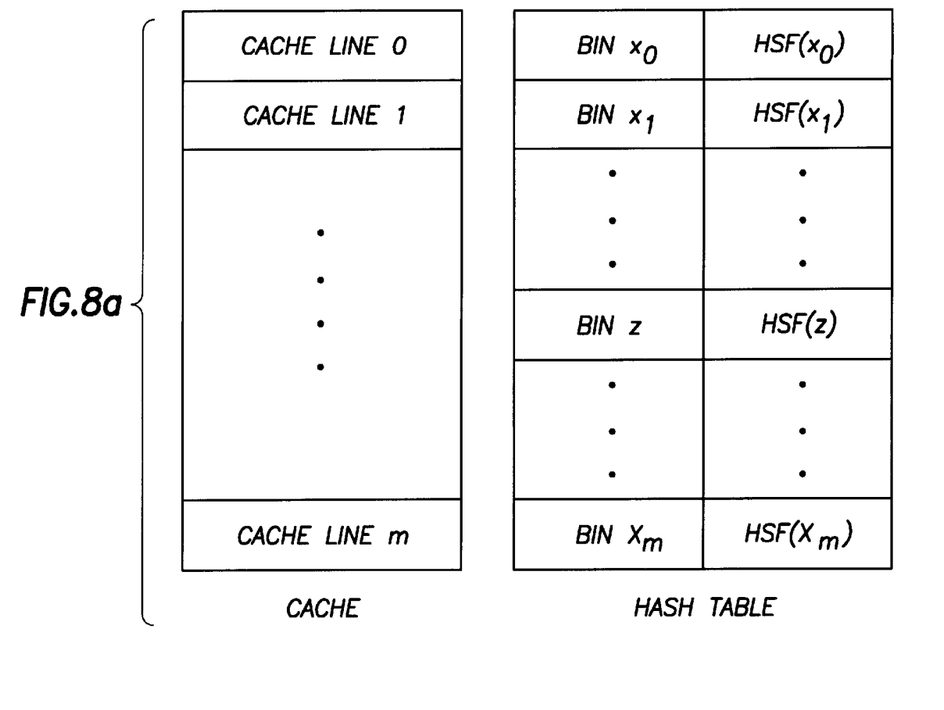
FIGS. 8a, 8b and 8c are diagrams illustrating an embodiment of a hot spot table or the present invention.

FIG. 8a illustrates one embodiment of the hot spot table. The hot spot table has m rows, where m is the number of cache lines in the memory controller cache. Each row in the hot spot table corresponds to the associated line in cache. For example, the fist row of the hot spot table corresponds to the first cache line of the cache. Each row in the hot spot table stores the hot spot value hsf(x) of the bin (x) that contains the data that is stored in the cache line associated with that row. Thus, the first row of the hot spot table corresponds to bin $x_0$, the bin that contains the data currently stored in cache line 0, and this first row contains the hot spot value hsf($x_0$) for that bin. Bin (z) is the bin with the lowest hot spot value in the hot spot table. In other words, bin (z) has the lowest hot spot value of all the bins that contain data that is currently located in cache. Note, two or more cache lines can contain data that reside in the same bin. Thus, the hot spot table can contain duplicate hsf(x) and bin values.

If a cache miss occurs instead of a cache hit, the data sought by the I/O access is read from the bin, designated bin (a), that contains this data in step 50. This data is then returned to the computer application. Next, the hsf(a) is calculated in step 52. At step 54, the memory controller determines whether or not the cache is full. Because cache space is limited, it is necessary to determine how data that is already present in the cache lines is to be replaced by data that is retrieved in response to a cache miss. As discussed above, by determining the hot spot value for each bin, cached data may be replaced by newly retrieved data based on the frequency with which a given bin was accessed over time.

If the cache is full, then at step 56, the hot spot value for the bin corresponding to the I/O access, hsf(α), is compared to hsf(z), the hot spot value for bin (z), the bin with data currently in cache that has the lowest hot spot value. Because bin (z) has the lowest hot spot value, this bin is the least likely of the bins with data currently in cache to contain data that will be required by fixture I/O accesses. As a result, the data from bin (z) that is currently in cache is the least likely of the data currently in cache to produce a cache hit in response to the future I/O accesses. However, the data from bin (z) that is currently in cache may still be more likely to produce a cache hit in response to the future I/O accesses than the data from bin (a) that was responsive to the current I/O access. Therefore, it is necessary to compare hsf(α) to hsf(z) to make this determination. The memory controller preferably comprises logic operable to calculate and compare hot spot values. Alternatively, other computer system components may be used to calculate and compare the hot spot values.

If hsf(z) is greater than hsf(a), then the data from bin (z) that is currently in cache is more likely to produce a cache hit in response to the future I/O accesses than the data from bin (a) that was responsive to the current I/O access. The data from bin (z) that is currently in cache may not necessarily be the actual data required by future I/O accesses because the size of a bin is generally greater than the size of a cache line. However, it is more likely that this data will be required because bin (z) has a greater hot spot value. Note that the number of cache hits may increase as the storage volumes are divided into more bins. Accordingly, as the bin size decreases to approach the size of a cache line, the accuracy of the caching algorithm increases (i.e. the level of granularity increases).

Therefore, if hsf(z) is greater than hsf(a), the data from bin (a) that was responsive to the current I/O access will not be placed in cache. On the other hand, if hsf(a) is greater than hsf(z), then the data from bin (z) that is currently in cache is less likely to produce a cache hit in response to the future I/O access than the data from bin (a) that was responsive to the current I/O access. Therefore, if hsf(a) is greater than hsf(z), the data from bin (a) that was responsive to the current I/O access will replace the data from bin z in cache in step 58. Note, if more than one line in cache are from the same bin, the algorithm has the option of deciding which cache line to replace with the current data. This decision can be made by a traditional LRU algorithm, a random algorithm, a round-robin algorithm or any other method.

Figure 8B:
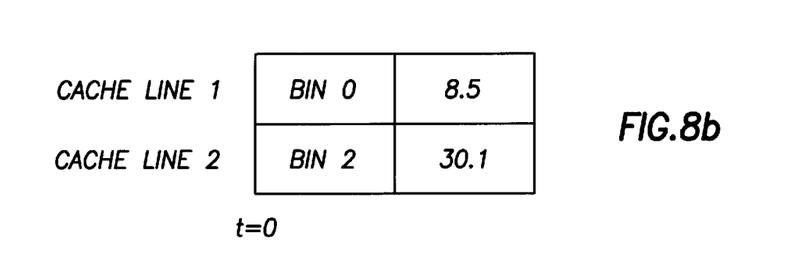
Figure 8C:
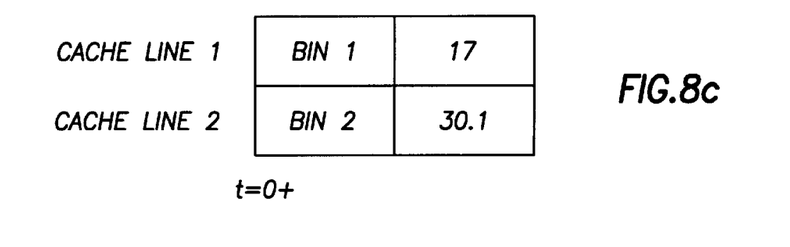

Next, in step 60, the hot spot table is updated to reflect the replacement. If hsf(z) equals hsf(a), then the storage or RAID controller may either replace the cache line associated with hsf(z) with the data from hsf(a) or retain the data in cache. If hsf(a) is not greater than hsf(z), then the cache line associated with hsf(z) is not replaced. For example, FIG. 8b shows the hot spot table at time t=0. The hot spot table reflects the status of the cache at time t=0. In this case, the cache has two lines, the first line contains data from bin 0 and the second line contains data from bin 2. Therefore, the hot spot table contains the hot spot values for these two bins hsf(0) and hsf(2) at time t=0. Using the values from FIG. 6a and Equation 1 for hsf(x), the hot spot table therefore contains the values 8.5 and 30.1 in the first and second rows, respectively. In this case, bin (0) has the lowest hot spot fact hsf(x) in the hot spot table. Suppose, at time t=0+, a time slightly greater than 0 but still in the current time window, an I/O access corresponding to bin 1 is made. Using the values from FIG. 6a and Equation 1 for hsf(x), the memory controller determines that the hot spot value for bin 1 at time t=1 is 17. Because this value exceeds 8.5, the data from bin 1 replaces the data from bin 0 in the cache. The hot spot table is accordingly updated as shown in FIG. 8c. If, on the other hand, the cache is not full, then the data from bin (a) may be added to cache in step 62. The hot spot table is then accordingly updated to reflect this addition in step 60. After the hot spot value hsf(a) has been added to the hot spot table, the memory controller is then ready for the next I/O access.

Figure 9:
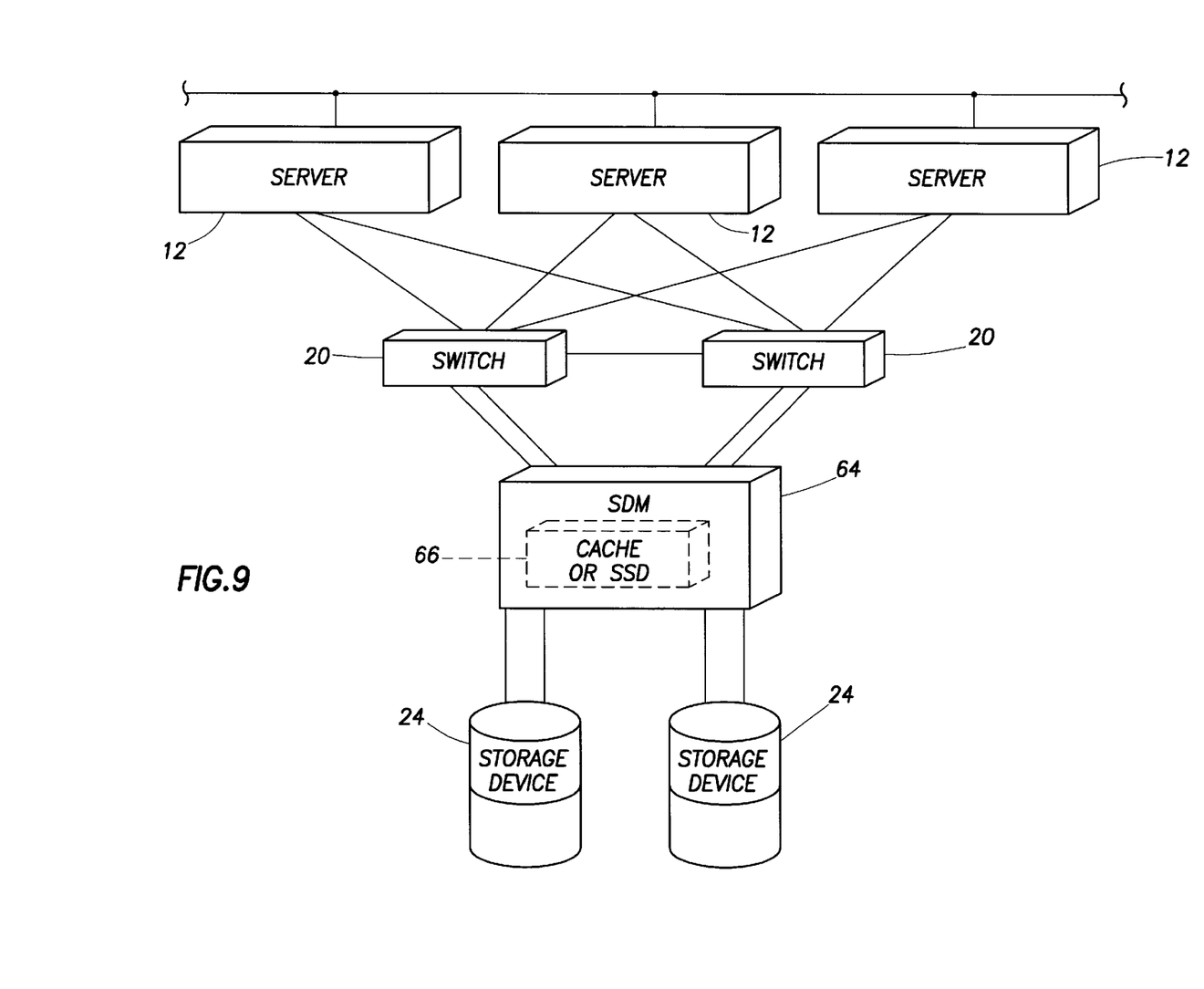
FIG. 9 is a diagram of a computer network.

The present invention is not limited to memory controllers. The present invention may be implemented by any computer system or network device that is operable to manipulate or maintain a cache. For instance, the present invention may be used by storage virtualizers such as storage domain managers or other network or SAN appliances that handle block level I/O and maintain a cache. For example, the storage domain manager (SDM) is a network appliance that contains a cache and is typically used in SAN applications to monitor I/O activity and performs routing functions. FIG. 9 shows a network configuration with an SDM 64. The SDM performs several functions. It allows storage subsystems from different vendors to be attached below the SDM. The SDM hides the storage type from the servers and presents the servers with only one type of storage. Because the SDM can communicate with different types of storage, the servers are freed from having to support multiple storage systems. This functionality may be called heterogeneous storage attachment. The SDM is also a central point of management for all storage. It provides LUN mapping and LUN masking. It also allows data to be mirrored between storage subsystems. Furthermore, the SDM also allows several storage subsystems to be logically combined in to one large storage volume. The SDM also has a caching capability to increase the performance of all storage subsystems and may accordingly use the present invention. Furthermore, the present invention is not limited to manipulating a cache. For example, the present invention may be used for solid state disks (SSD) or solid state memory. For instance, the SDM may have the option for adding SSD hardware 66 inside its chassis. The SDM may be configured to use the SSD as a caching unit. Therefore, the present invention may be applied to cache block level data on the SSD instead of the traditional cache memory.

Because the cache replacement algorithm of the present invention is based on frequency of use it is able to track hot spot data longer than least recently used algorithms or other conventional cache replacement methods. Thus, the present invention is able to improve cache hit performance for applications that exhibit low levels of locality, such as applications utilizing several large storage devices. The present invention optimizes cache content because it eliminates stale data from cache while retaining cached data that has the potential to produce cache hits over a selected period of time.

Although the disclosed embodiments have been described in detail, it should be understood that various changes, substitutions, and alterations can be made to the embodiments without departing from the spirit and the scope of the invention.

What is claimed is:

1. A computer network comprising:
   one or more storage devices, wherein the storage devices comprise a plurality of logical volumes, and wherein each logical volume comprises one or more bins, such that each bin corresponds to an area of a storage device;
   first and second memory locations;
   a cache, wherein the cache comprises one or more lines of cache operable to store data;
   a window access table stored in the first memory location, wherein the window access table contains frequency values corresponding to the number of times an I/O access was directed to data stored in each bin;
   a hot spot table stored in the second memory location, wherein the hot spot table contains hot spot values corresponding to the frequency values contained in the window access table for bins that contain data stored in the one or more lines of cache;
   logic for calculating the hot spot values and for making a comparison of the hot spot value for a bin that contains data responsive to an I/O access to one or more hot spot values stored in the hot spot table; and
   a network appliance operable to replace data stored in the one or more lines of cache based on the comparison.

2. The computer system of claim 1, wherein the network appliance is a memory controller.

3. The computer system of claim 2, wherein the memory controller is a storage controller.

4. The computer system of claim 1, wherein the network appliance is a storage virtualizer.

5. The computer system of claim 1, wherein the first and second memory locations are located in the cache.

6. The computer system of claim 1, wherein the network appliance comprises the cache.

7. The computer system of claim 1, wherein the window access table comprises a series of time windows for each bin, wherein each time window defines a period of time, such that each successive time window in a series represents a period further back in time and contains the frequency value corresponding to the number of times an I/O access was directed to data stored in the bin associated with that time window during the defied period of time.

8. The computer system of claim 7, wherein the hot spot value is expressed as: $\text{hsf}(x) = f_{x0} + \forall_1 f_{x1} + \forall_2 f_{x2} + \ldots + \forall_{k-1} f_{xk-1}$, wherein $f_{xy}$ is the frequency value contained in the window access table for bin x and time window y, and $\forall_j$ is a predetermined scaling factor for time window j.

9. The computer system of claim 7, wherein the hot spot value is expressed as: $\text{hsf}(x) = (f_{x0})^{\exists_1} + \forall_1 (f_{x1})^{\exists_2} + \forall_2 (f_{x2})^{\exists_3} + \ldots + \exists_{k-1} (f_{xk-1})^{\exists_k}$, wherein $\exists_j$ is a exponent associated with time window j that serves as a scaling parameter.

10. The computer system of claim 9, wherein $\exists_1 > \exists_2 > \ldots > \exists_k$.

11. The computer system of claim 8, wherein $\forall_1 > \forall_2 > \ldots > \forall_{k-1}$.

12. The computer system of claim 7, wherein the hot spot value is expressed as: $\text{hsf}(x) = N_x [f_{x0} + \forall_1 f_{x1} + \forall_2 f_{x2} + \ldots + \forall_{k-1} f_{xk-1}]$, wherein $f_{xy}$ is a frequency entry from the window access table for bin (x) and time window y, $\forall_j$ is a scaling factor for time window j, and $N_x$ is a scaling factor for bin (x).

13. The computer system of claim 1, wherein the hot spot value represents aggregated time weighted frequency components which represent access frequencies of the one or more storage devices.

14. The computer system of claim 1, wherein the network appliance comprises the logic.

15. A computer network comprising:
   one or more storage devices, wherein the storage devices comprise a plurality of logical volumes, and wherein each logical volume comprises one or more bins, such that each bin corresponds to an area of a storage device;
   a cache, wherein the cache comprises one or more lines of cache operable to store data;
   a window access table stored in the cache, wherein the window access table comprises a series of time windows for each bin, wherein each time window is a selected duration of time and corresponds to a selected period of time, such that each successive time window in a series represents a period further back in time and contains a frequency value corresponding to the number of times an I/O access was directed to data stored in the bin associated with that time window;

a hot spot table stored in the cache, wherein the hot spot table comprises one or more entries corresponding to a line of the cache, wherein each entry contains a hot spot value hsf(x) for the bin that contains data that is currently stored in the corresponding line of the cache, wherein the hot spot value is expressed as: $hsf(x)=f_{x0}+\forall_1 f_{x1}+\forall_2 f_{x2}+ \ldots +\forall_{k-1} f_{xk-1}$, wherein $f_{xy}$ is the frequency value contained in the window access table for bin x and time window y, and $\forall_j$ is a predetermined scaling factor for time window j, and wherein hsf(z) is the hot spot value for bin (z) and is the lowest hot spot value in the hot spot table, and wherein bin (z) contains data that is currently stored in a line of the cache; and a memory controller operable to compare hsf(a) to hsf (z) upon receiving an I/O access, wherein hsf(a) is the hot spot value for bin (a) and wherein bin (a) is the bin that contains data responsive to the I/O access, and replace the data from bin (z) that is in the cache with the data from bin (a) if hsf(a) is greater than hsf(z) and the cache is fill.

16. The computer system of claim 15, wherein the memory controller is a storage controller.

17. The computer system of claim 16, wherein the memory controller is a RAID controller.

18. The computer system of claim 15, where in the memory controller comprises the cache.

19. The computer system of claim 15, wherein $\alpha_1 > \alpha_2 > \ldots > \alpha_{k-1}$.

20. The computer system of claim 15, wherein the window access table comprises the hot spot table.

21. The computer system of claim 15, wherein each bin is of equal volume.

22. The computer system of claim 15, wherein the each time window is of equal duration.

23. The computer system of claim 15, wherein the computer system comprises a shared storage network.

24. A method for caching data retrieved from one or more storage devices coupled to a computer network, wherein the storage devices comprise a plurality of bins, such that each bin corresponds to an area of a storage device, comprising the steps of:

providing a cache, wherein the cache comprises one or more lines of cache operable to store data;

providing first and second memory locations;

providing a window access table in the first memory location, wherein the window access table contains frequency values corresponding to the number of times an I/O access was directed to data stored in each bin;

providing a hot spot table in the second memory location, wherein the hot spot table contains a hot spot value corresponding to the frequency values contained in the window access table for bins that contain data stored in the one or more lines of cache;

providing logic for calculating the hot spot values and for making a comparison of the hot spot value for a bin that contains data responsive to an I/O access to one or more hot spot values stored in the hot spot table;

providing a network appliance operable to replace data stored in the one or more lines of cache based on the comparison;

receiving an I/O access directed to data stored in a first bin;

calculating the hot spot value of the first bin;

comparing the hot spot value of the first bin to one or more hot spot values in the hot spot table; and determining which line of cache, if any, to replace with data responsive to the I/O access based on the comparison.

25. The method of claim 24, wherein the network appliance is a memory controller.

26. The method of claim 25, wherein the memory controller is a storage controller.

27. The method of claim 24, wherein the network appliance is a storage virtualizer.

28. The method of claim 24, wherein the first and second memory locations are located in the cache.

29. The method of claim 24, wherein the network appliance comprises the cache.

30. The method of claim 24, wherein the window access table comprises a series of time windows for each bin, wherein each time window defines a period of time, such that each successive time window in a series represents a period further back in time and contains the frequency value corresponding to the number of times an I/O access was directed to data stored in the bin associated with that time window during the defined period of time.

31. The method of claim 30, wherein the hot spot value is expressed as: $hsf(x)=f_{x0}+\forall_1 f_{x1}+\forall_2 f_{x2}+ \ldots +\forall_{k-1} f_{xk-1}$, wherein $f_{xy}$ is the frequency value contained in the window access table for bin x and time window y, and $\forall_j$ is a predetermined scaling factor for time window j.

32. The method of claim 24, wherein the network appliance comprises the logic.

33. A method for caching data retrieved from one or more storage devices coupled to a computer network, wherein the storage devices comprise a plurality of logical volumes, and wherein the logical volumes are apportioned to a plurality of bins, such that each bin corresponds to an area of a storage device, comprising the steps of:

providing a memory controller, providing a cache, wherein the cache comprises one or more lines of cache operable to store data;

providing a window access table, wherein the window access table comprises a series of time windows for each bin, wherein each time window is a selected duration of time and corresponds to a selected period of time, such that each successive time window in a series represents a period further back in time and contains a frequency value corresponding to the number of times an I/O access was directed to data stored in the bin associated with that time window;

providing a hot spot table, wherein the hot spot table comprises one or more entries corresponding to a line of cache, wherein each entry contains a hot spot value hsf(x) for the bin that contains data that is currently stored in the corresponding line of cache, wherein the hot spot value is expressed as: $hsf(x)=f_{x0}+\forall_1 f_{x1}+\forall_2 f_{x2}+ \ldots +\forall_{k-1} f_{xk-1}$, wherein $f_{xy}$ is the frequency value corresponding to bin x and time window y, and $\forall_j$ is a predetermined scaling factor for time window j;

receiving an I/O access directed to data stored in a first bin from an application, updating the frequency value in the window access table corresponding to the current time window for the first bin;

determining whether or not a cache hit or a cache miss has occurred;

sending the cached data to the application if a cache hit occurs;

recalculating the hot spot values for the bins that contain data that is currently stored in cache and updating the hot spot table with the recalculated hot spot values if a cache hit occurs;

reading data from an area of a storage device corresponding to the first bin and sending the data from the first bin to the application if a cache miss occurs;

calculating the hot spot value for the first bin, adding the data from the first bin to cache and updating the hot spot table with an entry corresponding to the hot spot value for the first bin for the associated line of cache, if a cache miss occurs and the cache is not fall; and comparing the hot spot value for the first bin to the hot spot value for a second bin, wherein the second bin is the bin with the lowest associated hot spot value in the hot spot table, and replacing the data associated with the second bin in cache line with the data from the second bin, and updating the hot spot table with the hot spot value for the first bin in the entry associated with the cache line that previously contained data from the second bin if the hot spot value for first bin is greater than the hot spot value for the second bin, a cache miss occurs and the cache is full.

34. The method of claim 33, further comprising the step of:

replacing the data associated with the second bin in cache line with the data from the first bin, and updating the hot spot table with the hot spot value for the first bin in the entry associated with the cache line that previously contained data from the second bin if the hot spot value for the first bin is equal to the hot spot value for the second bin, a cache miss occurs and the cache is full.

35. The method of claim 33, wherein the memory controller is a storage controller.

36. The method of claim 35, wherein the memory controller is a RAID controller.

37. The method of claim 33, wherein the memory controller comprises the cache.

38. The method of claim 33, wherein $\alpha_1 > \alpha_2 > \ldots > \alpha_{k-1}$.

39. The method of claim 33, wherein the window access table comprises the hot spot table.

40. The method of claim 33, wherein each bin is of equal volume.

41. The method of claim 33, wherein the each time window is of equal duration.

42. The method of claim 33, wherein the computer system comprises a shared storage network.

43. The method of claim 33, further comprising the following steps after the step of receiving an I/O access:

determining whether or not the duration of time for a time window corresponding to the most recent period of time has expired; and restructuring the window access table and updating the hot spot table, if the duration of time for the most recent time window has expired.

44. A network appliance operable to be coupled to a computer network comprising one or more storage devices wherein the storage devices comprise a plurality of bins, such that each bin corresponds to an area of a storage device, comprising:

first and second memory locations;

a cache, wherein the cache comprises
one or more lines of cache operable to store data,
a window access table located in the first memory location, wherein the window access table contains frequency values corresponding to the number of times an I/O access was directed to data stored in each bin;
a hot spot table located in the second memory location, wherein the hot spot table contains a hot spot value corresponding to the frequency values contained in the window access table for bins that contain data stored in a cache line; and
logic for calculating the hot spot values and for making a comparison of the hot spot value for a bin that contains data responsive to an I/O access to one or more hot spot values stored in the hot spot table.

45. The network appliance of claim 44, wherein the network controller is a memory controller.

46. The memory controller of claim 45, wherein the memory controller is a storage controller.

47. The memory controller of claim 46, wherein the memory controller is a RAID controller.

48. The network appliance of claim 44, wherein the network appliance is a storage virtualizer.

49. The network appliance of claim 44, wherein the network appliance is processor.

* * * * *